United States Patent [19] [11] 4,389,652
Fischbeck [45] Jun. 21, 1983

[54] BIDIRECTIONAL INK JET PRINTING

[75] Inventor: Kenneth H. Fischbeck, Dallas, Tex.
[73] Assignee: Xerox Corporation, Stamford, Conn.

[21] Appl. No.: 304,491
[22] Filed: Sep. 22, 1981
[51] Int. Cl.[3] .......... G01D 15/18
[52] U.S. Cl. .......... 346/1.1; 346/140 R
[58] Field of Search .......... 346/140 R, 75, 139 R, 346/1.1; 400/126

[56] References Cited

U.S. PATENT DOCUMENTS 3,136,594 6/1964 Ascoli .......... 346/1.1
3,871,004 3/1975 Rittberg .......... 346/75
4,314,282 2/1982 Fischbeck .......... 358/286
4,322,063 3/1982 Fischbeck .......... 267/160
4,349,828 9/1982 Fischbeck .......... 346/1.1

*Primary Examiner*—Joseph W. Hartary
*Attorney, Agent, or Firm*—Richard A. Tomlin

[57] ABSTRACT

The invention relates to an oscillating bar drop-on demand ink jet printer where printing occurs while the bar is moving bidirectionally over a transversely moving record-receiving surface. Specifically, the invention relates to a method of increasing the effective print speed of such a printer by electrostatically compensating for the inherent velocity variation of the oscillating bar as it oscillates.

1 Claim, 6 Drawing Figures

BIDIRECTIONAL INK JET PRINTING

The invention relates to an oscillating bar drop-on-demand ink jet printer where printing occurs while the bar is moving bidirectionally over a transversely moving record-receiving surface. Specifically, the invention relates to a method of increasing the effective print speed of such a printer by electrostatically compensating for the inherent velocity variation of the oscillating bar as it oscillates. As the bar oscillates, its velocity ranges from 0 at either end of the oscillation to a maximum $V_{max}$ at the midpoint of its ocillation. For such a sine wave motion, it can be shown that the average velocity $V_a$ is $2/\pi$ times $V_{max}$. This means that the printer operates at only about two-thirds of its maximum potential operation speed. Electrostatic droplet deflection can be used to allow the ink jet printer to achieve its maximum potential speed of operation. A surprisingly small amount of correction is required.

The foregoing advantages and features of the present invention will be apparent from the following more particular description of a preferred embodiment as illustrated in the accompanying drawing wherein.

Figure 1:
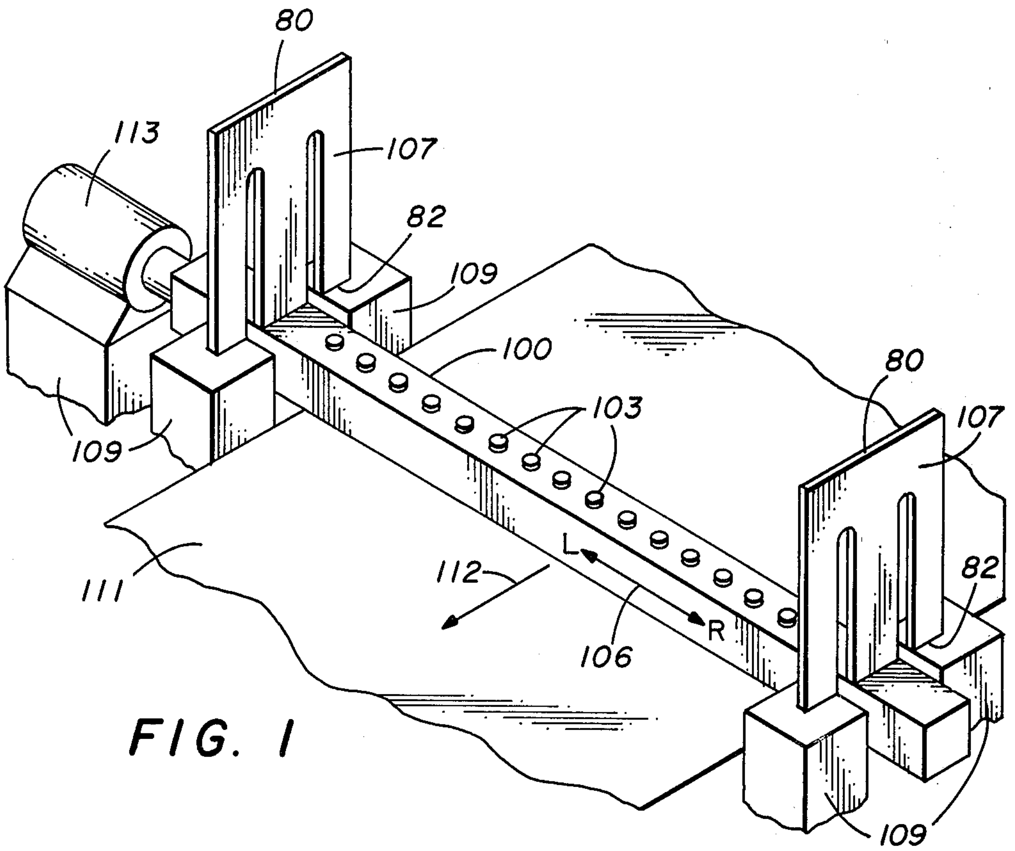
FIG. 1 is a perspective view of an oscillating bar printer in which the present invention is useful.

Referring now to FIG. 1, there is shown an oscillating bar printer. Specifically, there is shown a raster input scan/raster output scan (RIS/ROS) support member 100, which may be, for example, of a plastic material. Supported by RIS/ROS support member 100 are scanning/reading means represented here by discs 103, which may be, by way of example, photodetectors. Also supported by RIS/ROS support member 100 are marking elements 105 (see FIG. 2), which, in this exemplary instance, are drop-on-demand ink jets. Conveniently, one marking element 105 can be provided for each reading element 103; however, this is not necessary. RIS/ROS support member 100 is suspended for axial oscillatory movement along the long axis of RIS/ROS support member 100 in the directions shown by arrow 106 by flexure mounts 107, which act as multiple compounded cantilever springs. That is, not only does the support member 100 pivot around edge 80, but edge 80 pivots around edge 82. This double pivoting action keeps RIS/ROS support member 100 in spaced relationship to record-receiving member 111 with a minimum amount of swing or arc over its complete travel. RIS/ROS support member 100 is oscillated by oscillating means 113, which may be, for example, a solenoid. Solenoid 113 is also fixed to base 109 as are flexure mounts 107.

Figure 2:
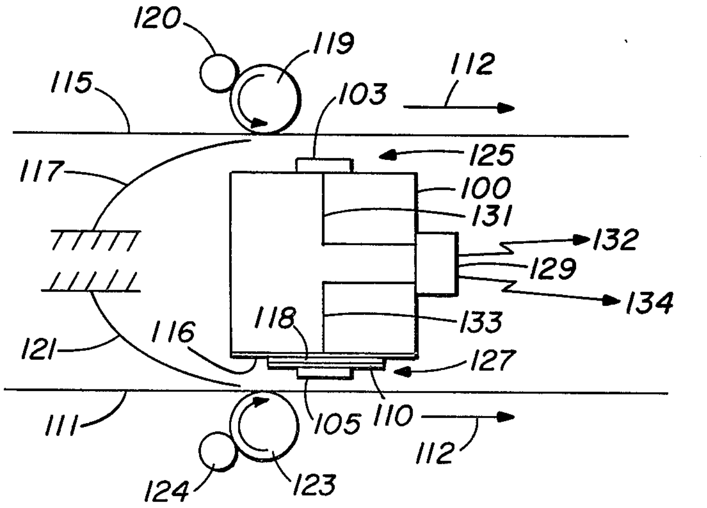
FIG. 2 is a side-sectional view of the oscillating bar printer of FIG. 1.

Referring now to FIG. 2, which is a schematic representation of a side view of the oscillating bar printer of FIG. 1, with the base 109 and flexure mounts 107 not shown for purposes of clarity. Document 115, which is to be scanned by photodetectors 103, is guided by leaf-spring fingers 117 into contact with drive guide roller means 119, which, when driven by motor 120, pulls document 115 across the reading path of photodetectors 103 through image-reading station designated generally as 125. Document 115 and roller 119 were not shown in FIG. 1 to simplify understanding of the construction of the oscillating bar printer. Leaf-spring fingers 121 are used to guide record-receiving member 111, which may be, for example, paper, into contact with drive guide roller 123. Roller 123 driven by motor 124 guides and pulls record-receiving member 111 through the image-marking station designated generally as 127. Controller 129 is used to receive the input signal 131 from the photodetectors 103 and to produce an output signal 133 to ink jets 105. Controller 129 is conveniently mounted on oscillating RIS/ROS support member 100.

Where the oscillating bar printer is used as a copier, a document 115 to be copied and a copy sheet 111 are fed into the nips formed by leaf-spring fingers 117 and drive roller 119 and leaf-spring fingers 121 and drive roller 123, respectively. Solenoid 113 is activated causing RIS/ROS support member 100 to vibrate or oscillate axially a distance approximately equal to the distance between photodetectors 103 to ensure that all areas of document 115 are read or scanned. Drive roller motors 120 and 124 are activated causing rotation of rollers 119 and 123 in such manner that document 115 and record-receiving member 111 are advanced at about the same speed or in synchronization. That is, the document and copy may be advanced together either continuously or stepwise. Preferably, the document 115 and copy sheet 111 are moved continuously because less expensive drive means and less circuitry are required than for stepwise movement. It can be seen then that, where RIS/ROS support member 100 is oscillated from side to side, and copy sheet 111 is moved continuously at right angles thereto, the resultant trace is a sine wave. As document 115 is advanced, it is scanned by photodetectors 103, which send singals 131 to controller 129. Controller 129, in response to input signals 131, provides output signals 133, which trigger the appropriate ink jets 105. In this manner, a copy is formed on sheet 111 corresponding to the document 115. Obviously, signals 134 could be provided from a remote source, for example, facsimile or computer devices in which case photodetectors 103, document 115 and associated document feed apparatus would not be activated or required. Also, signals 132 could be transmitted to a remote source.

Figure 3:
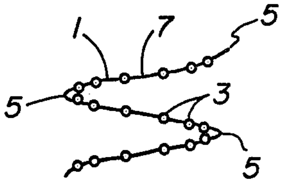
FIG. 3 represents possible ink jet droplet marking positions without electrostatic compensation superimposed on a sine wave, which sine wave represents the trace an ink jet nozzle supported on an oscillating bar would produce on a continuously moving record-receiving member.
Figure 5:
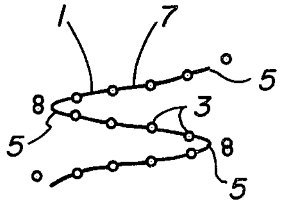
FIG. 5 represents possible ink jet droplet marking positions with electrostatic compensation superimposed on a sine wave, which sine wave represents the trace an ink jet nozzle supported on an oscillating bar would produce on a continuously moving record-receiving member.

Referring now to FIG. 3, there is shown a representation of the sine wave formed by the trace of an ink jet nozzle on a continuously moving record-receiving sheet. FIGS. 3 and 5 are not drawn to scale in order to make demonstration of the principle of this invention clearer. For example, the marking positions 3 on sine wave 1 would normally be much closer together, and the sine wave would be much flatter. The marking positions 3 in FIG. 3 vary in distance from each other because it is simplest to design the ejector to eject at a constant time interval; however, the velocity of the oscillating bar varies from 0 at either extreme 5 of its oscillation to $V_{max}$ at the center 7 of its oscillation. It should be made clear that marking positions 3 represent those positions where an ejector could be fired. In drop-on-demand systems, a droplet is ejected only where a mark is required. It can be seen that the ejector operates accordingly at a speed, which is $2/\pi$ times $V_{max}$ since that is the nature of a sinusoidally operating member.

Figure 4:
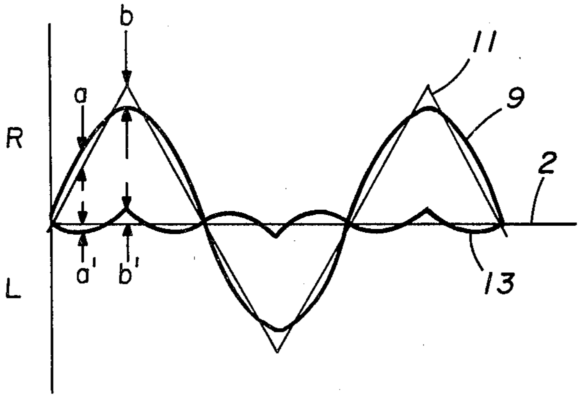
FIG. 4 is a graph of distance versus time for the oscillating bar showing the actual bar position, the optimum bar position and the correction required to compensate for the difference.
Figure 6:
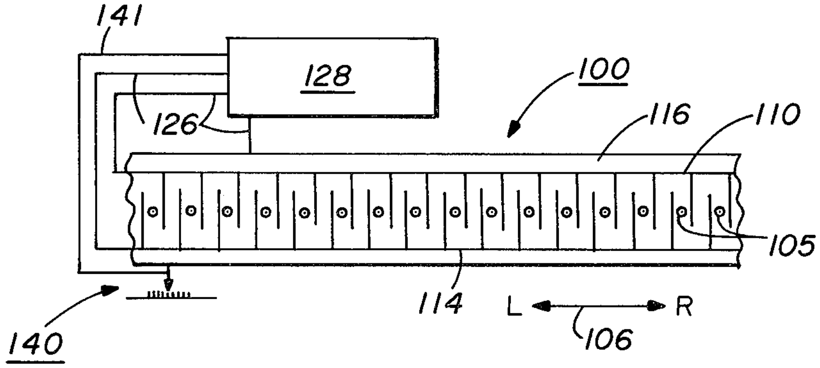
FIG. 6 is a plan view of the nozzle face of a portion of the oscillating bar showing the deflecting electrode structure.

Referring now to FIG. 4, there is shown a graph of distance versus time for an ejector 105 on RIS/ROS support member 100 showing the simple harmonic motion sine wave 9 with the distance above and below the line representing distance from the midpoint 2, or the at rest position of RIS/ROS support member 100. The distance of oscillation in direction R is shown by the plot above line 2, and the distance below line 2 represents the distance from the midpoint 2 of the oscillation in direction L as seen in FIG. 6. The optimum operation of the oscillating RIS/ROS support member 100 is represented by sawtooth wave 11. This result is, of course, impossible to achieve in practice because infinite acceleration would be required. It can be seen, however, that to alter sine wave 9 to sawtooth wave 11, it is only necessary to provide a distance correction equal to the distance, for example a and b, between sine wave 9 and sawtooth wave 11. For example, where RIS/ROS support member 100 is moving in direction R just having passed the midpoint 2, droplets are marking too far ahead of the desired marking location a distance equal to a. That is, marking droplets are being ejected too far in direction R to correspond to the desired sawtooth wave pattern 11 by a distance a. To conform this marking to sawtooth wave 11, the droplet is electrostatically deflected back in the direction L a similar distance shown as distance a′ between line 13 and midpoint 2. As RIS/ROS support member 100 approaches its extreme position in the R direction, shown by the top of sine wave 9, the ejector ejects droplets too far behind in the direction L to conform to the preferred sawtooth wave 11. Here it is necessary to deflect the droplets in a direction R a distance equal to b. This distance is represented by distance b′ between line 13 and midpoint 2. Line 13, which is the difference between sawtooth wave 11 and sine wave 9, represents the electrostatic deflection required to conform the sine wave 9 to the preferred sawtooth wave pattern 11.

Referring now to FIG. 5, there is shown how the droplets, which have been electrostatically deflected a distance corresponding to line 13 in FIG. 4, appear in relation to the sine wave trace 1 (an ink ejector supported on an oscillating support member would produce on a continuously moving record-receiving member). It can be seen that the droplets are evenly spaced. That is, the drops are spaced an equal distance from each other in the direction parallel to the direction of oscillation of RIS/ROS support member 100. The significance of the present concept is that an ejector operating at a rate of say 10,000 drops per second can only operate at the rate of about 6,400 drops per second without electrostatic deflection correction. With correction, however, the system will be able to operate at the full 10,000 drops per second rate, an increase of about one-half in printing speed.

Referring now to FIG. 6, there is shown a partial plan view representing a portion of RIS/ROS support member 100. Ink jet nozzle 105 expels droplets through conductive faceplate 116 formed on the ink jet nozzle side of RIS/ROS support member 100. Electrostatic deflection electrodes 110 and 114 are mounted on RIS/ROS support member 100 between ink jets 105 as shown in FIG. 6. That is, the ink jets 105 and electrodes 110 and 114 are aligned parallel to the long axis of RIS/ROS support bar 100. Insulating material 118 (see FIG. 2) is placed between the electrodes 110, 114 and the conductive faceplate 116. Faceplate 116 and electrodes 110 and 114 are connected by electrical leads 126 to source of potential and controller 128. In order to deflect droplets a distance represented by line 13 in FIG. 4, electrodes 110 and 114 are utilized. Since the velocity of RIS/ROS support member 100 varies from 0 to $V_{max}$ and back again with each oscillation cycle, and since the direction changes from L to R for each oscillation cycle, it is necessary not only to alternate the electrode that is being activated, but the amount of potential applied should also be varied to correspond the deflection to the amount as shown by line 13 in FIG. 4. More particularly, as RIS/ROS support member 100 moves to the right, as seen in FIG. 6, the velocity of the RIS/ROS support member 100 throws the drop ahead, at first too far. To correct this RIS/ROS support member velocity induced droplet offset, electrodes 114, that is, the trailing electrodes, are activated to deflect the droplets in direction L, as shown in FIG. 6. The resultant should approximate line 11. Similarly, when RIS/ROS support member 100 is moving further in direction R but slowing down so that correction b′ in FIG. 4 is required, electrodes 110, the leading electrodes, are activated to deflect the droplets ahead or in the direction R. Similarly, when RIS/ROS support member 100 is moving in direction L, the opposite corrections are required. For best results, it is desirable to provide a linear encoder shown geneally as 140 in FIG. 5 to determine the direction of travel and the velocity of RIS/ROS support member 100. The direction of travel and velocity information derive from the linear encoder 140 is transmitted by line 141 to electrode controller 128. Electrode controller 128 reads the linear encoder input signal and controls the potential applied to lines 126 and hence to electrodes 114 and faceplate 116 or electrodes 110 and faceplate 116, depending on the direction of travel of RIS/ROS support member 100 and the amount of potential depending on RIS/ROS support member velocity. That is, the electrode controller 128 is programmed to control which electrode 110, 114 is activated, and how much potential is required to conform the simple harmonic waveform 9 of the oscillating bar printer to the preferred sawtooth waveform 11 as shown in FIG. 4.

Although specific components have been disclosed herein, many modifications and variations will occur to those skilled in the art. Such modifications and variations are intended to be included within the scope of the appended claims.

What is claimed is:

1. A method of operating a drop-on-demand ink jet ejector, which comprises:

(a) providing an ink jet ejector on a support member, (b) oscillating said support member, (c) moving a record-receiving member in a direction perpendicular to the direction of oscillation of said support member, (d) providing deflection electrodes on said support member on each side of said ink ejector in a direction parallel to the direction of oscillation of said support member, (e) ejecting droplets from said ejector, and (f) electrostatically deflecting droplets ejected from said ejector an amount sufficient to ensure that any two contiguous droplets are spaced from each other a distance in the direction parallel to the direction of oscillation of said support member that does not vary regardless of the support member position.

* * * * *